(12) United States Patent
Foerg

(10) Patent No.: US 10,220,226 B2
(45) Date of Patent: Mar. 5, 2019

(54) FIRE-PROTECTION TAPE

(71) Applicant: HILTI AKTIENGESELLSCHAFT, Schaan (LI)

(72) Inventor: Christian Foerg, Lamerdingen (DE)

(73) Assignee: HILTI AKTIENGESELLSCHAFT, Schaan (LI)

(*) Notice: Subject to any disclaimer, the term of this patent is extended or adjusted under 35 U.S.C. 154(b) by 36 days.

(21) Appl. No.: 15/322,984

(22) PCT Filed: Jun. 30, 2015

(86) PCT No.: PCT/EP2015/064806
§ 371 (c)(1),
(2) Date: Dec. 29, 2016

(87) PCT Pub. No.: WO2016/001205
PCT Pub. Date: Jan. 7, 2016

(65) Prior Publication Data
US 2018/0071558 A1    Mar. 15, 2018

(30) Foreign Application Priority Data
Jun. 30, 2014   (EP) ..................... 14174878

(51) Int. Cl.
    *A62C 2/06*     (2006.01)
    *F16L 5/04*     (2006.01)
    *F16L 55/10*     (2006.01)
    *H02G 3/04*     (2006.01)
    *E04B 1/94*     (2006.01)

(52) U.S. Cl.
CPC ............. *A62C 2/065* (2013.01); *E04B 1/948* (2013.01); *F16L 5/04* (2013.01); *F16L 55/1026* (2013.01); *H02G 3/0412* (2013.01)

(58) Field of Classification Search
CPC ............. A62C 2/065; E04B 1/948; F16L 5/04
USPC .......................................................... 52/232
See application file for complete search history.

(56) References Cited

U.S. PATENT DOCUMENTS

| | | | |
|---|---|---|---|
| 5,105,592 A * | 4/1992 | MacMillan | F16L 5/04 52/232 |
| 5,970,670 A * | 10/1999 | Hoffman | F16L 5/04 285/192 |
| 6,862,852 B1 * | 3/2005 | Beele | A62C 2/065 137/67 |

(Continued)

FOREIGN PATENT DOCUMENTS

DE    40 41 470 A1    6/1992
DE   100 03 856 A1    8/2001
(Continued)

OTHER PUBLICATIONS

International Search Report dated Sep. 24, 2015, in PCT/EP2015/064806 filed Jun. 30, 2015.

*Primary Examiner* — Paola Agudelo
(74) *Attorney, Agent, or Firm* — Grüneberg and Myers PLLC

(57) ABSTRACT

A fire-protection tape (22) to be placed into gaps (12) in walls or ceilings (10) of buildings has at least two plies (24a, 24b) composed of an intumescent material, wherein the plies (24a, 24b) have a first longitudinal edge (26a, 26b) on one outer side and a second longitudinal edge (28a, 28b) on an opposite outer side, in each instance, wherein the plies (24a, 24b) are flexibly connected with one another.

19 Claims, 2 Drawing Sheets

(56) References Cited

U.S. PATENT DOCUMENTS

Figure 1:
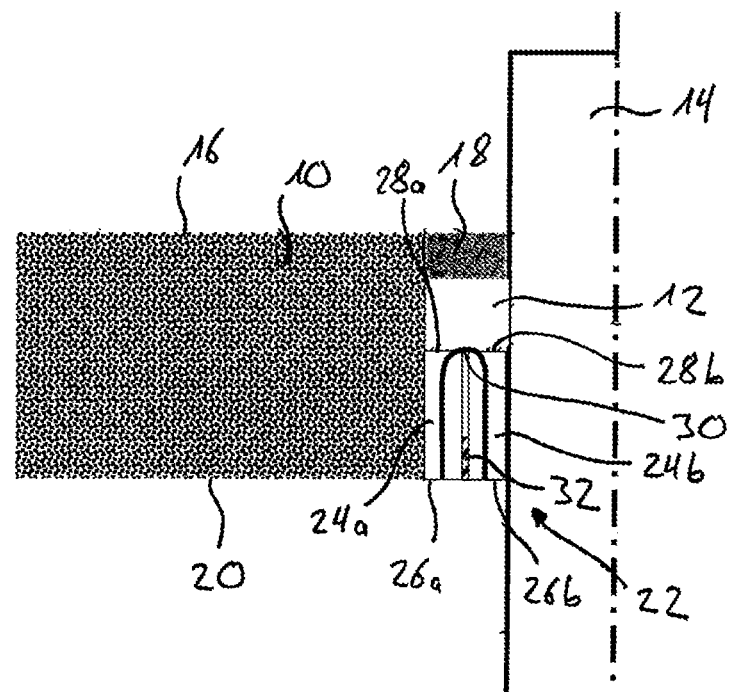

| | | | | |
|---|---|---|---|---|
| 7,797,893 B2* | 9/2010 | Stahl, Sr. | ................... | F16L 5/04 |
| | | | | 52/220.8 |
| 8,353,139 B2* | 1/2013 | Pilz | ......................... | E04B 1/948 |
| | | | | 52/232 |
| 8,671,632 B2* | 3/2014 | Pilz | ......................... | E04B 1/948 |
| | | | | 52/232 |
| 9,580,921 B2* | 2/2017 | Muenzenberger | ......... | F16L 5/04 |
| 9,861,843 B2* | 1/2018 | Paetow | ................... | A62C 2/065 |
| 2012/0280099 A1* | 11/2012 | Forg | ....................... | A62C 2/065 |
| | | | | 248/309.1 |
| 2013/0061544 A1* | 3/2013 | Stahl, Jr. | ................... | A62C 2/10 |
| | | | | 52/232 |
| 2013/0086856 A1* | 4/2013 | Paetow | ................... | A62C 2/065 |
| | | | | 52/232 |
| 2013/0086857 A1* | 4/2013 | Paetow | ................... | A62C 2/065 |
| | | | | 52/232 |
| 2013/0186020 A1* | 7/2013 | Pilz | ....................... | E04B 2/7411 |
| | | | | 52/232 |
| 2017/0165509 A1* | 6/2017 | Foerg | ....................... | A62C 2/065 |
| 2017/0314257 A1* | 11/2017 | Foerg | ....................... | E04B 1/948 |

FOREIGN PATENT DOCUMENTS

| | | |
|---|---|---|
| DE | 20 2012 003 405 U1 | 7/2013 |
| EP | 2 505 891 A1 | 10/2012 |
| EP | 2 578 274 A2 | 4/2013 |
| WO | WO 2013/160776 A1 | 10/2013 |

\* cited by examiner

FIRE-PROTECTION TAPE

CROSS REFERENCE TO RELATED APPLICATIONS

This application is the National Stage entry under § 371 of International Application No. PCT/EP2015/064806, filed on Jun. 30, 2015, and which claims the benefit of European Application No. 14174878.0, filed on Jun. 30, 2014.

The invention relates to a fire-protection tape to be placed into gaps in walls or ceilings of buildings.

Various systems are known for preventing the spread of fire or smoke in buildings, which systems can dose openings or gaps in ceilings or walls in the event of a fire. Frequently, components having an intumescent material are used for this purpose, which components are disposed on or in the opening. If a fire occurs, the intumescent material foams up due to the rising temperature, and closes the opening in this manner, thereby preventing or at least delaying the spread of smoke or fire through this opening.

The intumescent material is delivered as a fire-protection tape, for example, which can be laid into openings or wall gaps. This allows flexible adaptation to the shape and the size of the opening and to the lines that are laid through these openings.

For optical reasons, the fire-protection tapes are usually laid into the opening or the gap. However, this has the disadvantage that in the event of a fire, the face side of such a tape or of a cuff having such a fire-protection tape, which side faces the fire first, is exposed to the high temperatures with a relatively small surface. The material foams up at this face side, and as a result, because of the insulating properties of the foamed material, shielding of the material that lies behind it, against the rising temperatures, takes place. The material that lies behind it therefore only becomes active with a time delay, since the temperature increase is slowed down by the material that has already foamed up. This effect is additionally reinforced, for example, in that the fire-protection tape is additionally shielded or actually cooled by the walls that lie against it, particularly if the fire-protection tape is embedded in the wall or the ceiling.

This problem particularly occurs in the case of large-volume lines, for example water lines and sewer lines, which are laid through the gaps. These are frequently produced from a material having very thin walls, which has a melting point below the activation temperature of the intumescent material of the fire-protection tape. Usual materials for such pipes are, for example, polyethylene or polypropylene, which have a melting temperature of 130° C. to 145° C. and 160° C., respectively. The intumescent materials usually have an activation temperature of approximately 200° C.

In order to eliminate this problem, material combinations are known from the state of the art, for example from EP 2 088 183 A1 or U.S. Pat. No. 5,137,658, which combinations have a propellant that has a lower activation temperature, in addition to the intumescent material. These material combinations have a quasi two-stage intumescence, thereby causing a volume increase to already occur at a low temperature. However, the problem that a surface that has already foamed up shields the layers that lie underneath also exists with these material combinations.

A further solution possibility is known from DE 20 2012 003 405 A1. According to this document, the intumescent material has channels that extend from the surface into the material. These channels are supposed to allow faster heating of the fire-protection tape, because of the increased surface area. However, as soon as the material begins to foam up, these channels are closed, so that their effect is reduced.

It is the task of the invention to provide a fire-protection tape that makes more rapid expansion available and can quickly and reliably close off a large cross-section.

To accomplish the task, a fire-protection tape to be laid into gaps in walls or ceilings of buildings is provided, having at least two plies composed of an intumescent material, wherein the plies have a first longitudinal edge on one outer side and a second longitudinal edge on an opposite outer side, in each instance, wherein the plies are flexibly connected with one another.

Heat usually acts on the fire-protection tape at first on a face side that faces the fire, in other words on the first or the second longitudinal edges. If the material of the plies is activated at these longitudinal edges, it foams up and presses the two plies apart from one another at these longitudinal edges, so that of the two, the ply that lies on the inside is pressed into the gap or into the cavity that is formed by the melting pipe or the melting line. According to the invention, in the event of a fire, the two plies, which can move relative to one another, can therefore be pressed apart at first, so that they have a larger surface area that is available for direct action of the heat.

Because the inner ply is folded into the gap, narrowing of the gap is already created by the ply that has not foamed up. If both plies subsequently foam up completely, something that takes place more rapidly because of the larger surface area, they do not reciprocally hinder one another, because the plies are at a greater distance from one another. Furthermore, in this way a significantly greater volume can be filled by the foamed-up material.

The plies are separate plies, for example.

The plies are connected with one another, for example, particularly by the flexible connection means, in such a manner that they are pressed apart by activation of the intumescent material at the free longitudinal edge, in each instance, in other words the longitudinal edge that lies opposite the connection means, and subsequently gape apart. Therefore the cross-section through which the smoke or fire can penetrate is already reduced by the ply of the fire-protection tape that projects into the cavity, before the material has completely foamed up. Because of the ply projecting into the gap, the fire-protection tape can subsequently fill a significantly greater volume or close off a significantly larger cross-section by foaming up than fire-protection tape having a single ply of the same thickness, which lies flat against the edge of the opening.

In order to connect the plies flexibly with one another, a flexible connection means is preferably provided, wherein the connection means is connected with the plies only at their first longitudinal edges or only at their second longitudinal edges, in each instance. This connection means ensures, during installation and in the non-activated state, that the two plies are not moved relative to one another. Furthermore, the flexible connection means can form a type of articulation about which the plies can be pivoted or moved relative to one another.

The connection means has a woven fabric, for example, particularly a woven fiberglass fabric, which has a correspondingly high temperature resistance to ensure reliable connection of the plies even in the event of a fire.

The connection means can additionally have a flexible expansion region between the plies, by means of which the plies can be pressed apart by a certain amount even at the longitudinal edge at which they are connected with one another by the connection means.

The expansion region is preferably folded at least once, particularly multiple times, so that it can be disposed between the plies in space-saving manner. Therefore the connection region is not disruptive during installation of the fire-protection tape, since it is disposed between the two plies, in protected manner. The plies can be connected with the connection means in different ways. For example, the plies are connected with the connection means over its full area, particularly glued onto it. This allows simple production, because the plies and the connection means can be produced separately from one another and subsequently connected with one another.

The connection means can be connected with the two plies at their surfaces that face away from one another. In this embodiment, the connection means quasi encloses the fire-protection tape or the two plies, so that these are disposed between the connection means, in protected manner.

Alternatively, however, it is also conceivable that the connection means extends into the plies, at least in part, particularly is cast into them.

In order to facilitate laying of such a fire-protection tape, a connection is preferably provided between the two plies, which connects the plies with one another with shape fit and/or material fit. This connection can be dissolved at a temperature below the intumescence temperature of the two plies, particularly below 60° C. By means of this connection, the two plies are fixed in place relative to one another, so that they can be laid quasi as a multi-ply tape. In order not to hinder reciprocal movement of the plies in the event of a fire or in the case of activation of the intumescent material, the temperature at which the connection can be released is selected in such a manner that the connection loses its strength far below the intumescence temperature of the plies, so that when the intumescence temperature is reached, unhindered spreading or movement of the two plies is possible.

The connection can be formed, for example, by means of a thread, a clip or a connection layer, wherein the thread or the clip consists of a material that decomposes, melts, or softens to such an extent, at a temperature below the intumescence temperature of the plies, that when the intumescence temperature is reached, unhindered spreading or movement of the two plies is possible, such as plastic, for example polyester. The connection layer can be formed, for example, by means of a double-sided adhesive tape, which allows a simple connection of the plies with the connection layer.

In order to achieve better heat introduction into the plies, at least one ply can have ribs and/or channels that run away from a longitudinal edge, by means of which the increasing temperature can act further into the plies.

Figure 2:
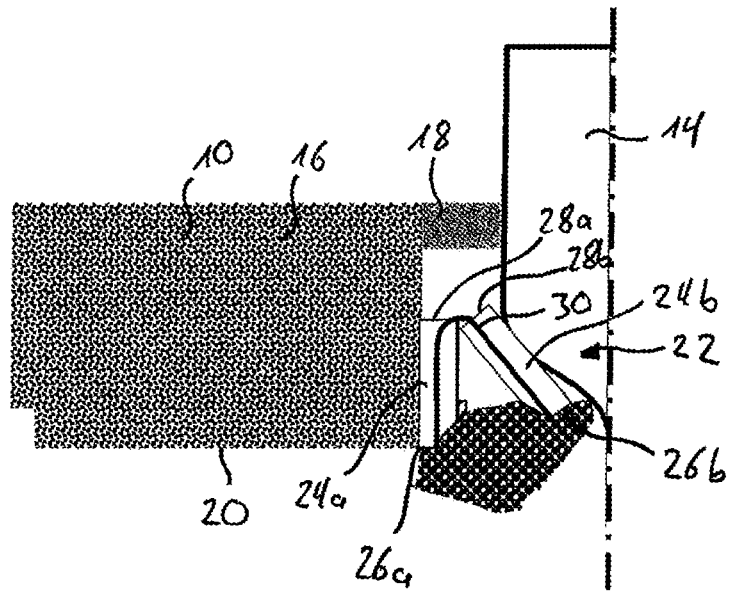
Figure 3:
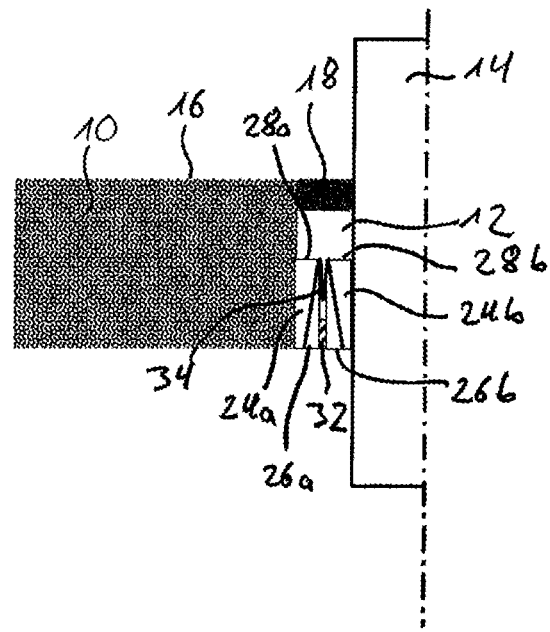
Figure 4:
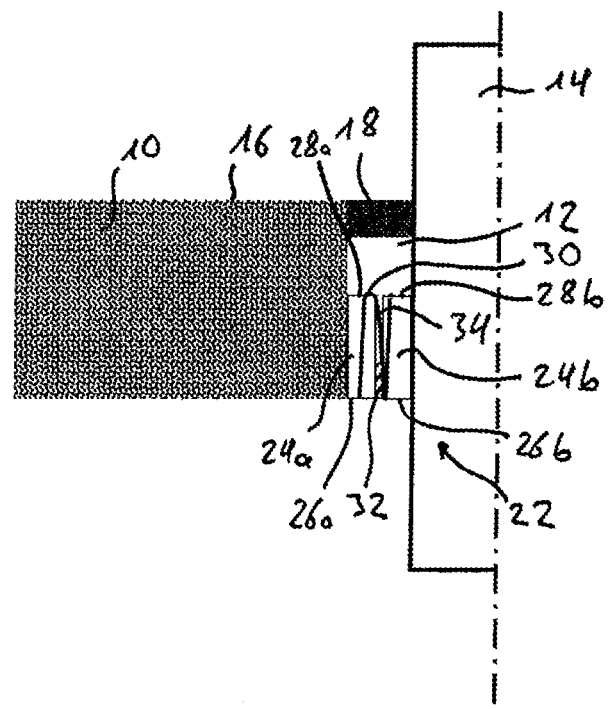

Further advantages and characteristics are evident from the following description in connection with the attached drawings. These show:

FIG. 1 a gap in a ceiling, with a fire-protection tape according to the invention, FIG. 2 the gap from FIG. 1 with an activated fire-protection tape, FIG. 3 a second embodiment of a fire-protection tape according to the invention, and FIG. 4 a third embodiment of a fire-protection tape according to the invention.

In FIG. 1, a ceiling 10, for example composed of concrete, is shown, having a gap 12, through which a line 14 is laid.

The line 14 is, for example, a water pipe or sewer pipe, which consists of plastic, for example polyethylene or polypropylene.

On the top side 16 of the ceiling 10, a cover element 18 is provided in the ring-shaped slot between line 14 and ceiling edge. On the underside 20 of the ceiling 10, a fire-protection tape 22 is disposed in the slot, which tape can close off the gap 12 in the event of a fire, and thereby prevent or at least delay entry of smoke or fire.

The fire-protection tape 22 is supplied as an endless material, for example on a roll, and laid circumferentially around the line 14 and into the gap 12.

As can be seen in FIG. 1, the fire-protection tape 22 has two plies 24a, 24b that are continuous in the longitudinal direction, composed of an intumescent material that foams up under the effect of heat and in this way increases its volume, thereby making it possible to close off the gap 12 and to prevent entry of fire or smoke. The plies 24a, 24b have a first longitudinal edge 26a, 26b, which faces the underside 20, as well as an opposite second longitudinal edge 28a, 28b, in each instance.

As can be seen in FIG. 1, the plies 24a, 24b are flexibly connected with one another at the second longitudinal edges 26a, 26b by a flexible connection means 30, in this embodiment a woven fabric tape with a woven fiberglass fabric. The connection means 30 extends into the plies 24a, 24b, so that the plies 24a, 24b are connected with the connection means 30 with shape fit, wherein the connection means 30 extends from the second longitudinal edges 28a, 28b all the way to the first longitudinal edges 26a, 26b. The plies 24a, 24b can be pivoted about their second longitudinal edges 28a, 28b, relative to one another, by this flexible connection means.

Furthermore, a connection layer 32 is provided, which is assigned to the first longitudinal edges 26a, 26b in this embodiment, and fixes the two plies 24a, 24b in place relative to one another. This connection layer 32 has a melting temperature clearly below the intumescence temperature of the plies 24a, 24b, which usually lies in the range of approximately 200° C. Preferably, the melting temperature of the connection layer lies at approximately 60° C.

Production of the fire-protection tape 22 takes place, for example, in that a ply composed of an intumescent material capable of flow or capable of being brushed is cast into a mold. Subsequently, the connection means 30 is laid onto the material. Dependent on how liquid the material is, the connection means 30 can sink into it or remain lying on its surface, and can connect with it with material fit. If the connection means 30 does not sink into the material, further material can be introduced into the mold, so that the connection means 30 is enclosed by it.

Subsequently, the connection layer 32 is applied to the surface, for example laid on. This can take place in the still damp state of the material, so that the connection layer 32 connects with the material with material fit.

In a final production step, the material is laid together with the connection means 30, in the not yet hardened state of the material, in such a manner that the intermediate ply is situated between two sections of the material, which define the first and the second ply 24a, 24b, in each instance.

In the event of a fire, the face side formed by the first longitudinal edges 26a, 26b of the fire-protection tape 22 is exposed to the fire and heated. The connection layer 32 is also heated with it at the same time.

Because the melting temperature of the connection layer lies far below the intumescence temperature of the two plies 24a, 24b, this layer already melts before the plies 24a, 24b foam up. Therefore the plies 24a, 24b are no longer connected with one another before a foaming process, and can move flexibly relative to one another, about the second longitudinal edges 28a, 28b.

As can be seen in FIG. 2, the material begins to foam up at the first longitudinal edges 26a, 26b, thereby causing the plies 24a, 24b to be pressed apart at the first longitudinal edges 26a, 26b. The second ply 24b is pressed away from the edge of the gap 12 or in the direction of the line 14 with the first longitudinal edge 26a, due to the foaming of the material at these longitudinal edges 26a, 26b. Because of the low melting temperature of the line 14, the latter has already melted or is clearly constricted. The second ply 24b is moved into the resulting cavity.

As can be seen in FIG. 2, a large portion of the cross-section of the gap 12 is closed off by the plies 24a, 24b gaping apart, even before the material of the plies 24a, 24b has completely foamed up, particularly by means of the second ply 24b, which projects into the gap 12. Because a significantly greater surface area is subsequently present on the individual plies 24a, 24b, which is exposed to fire, faster heat introduction and thereby faster foaming of the plies 24a, 24b takes place, so that the gap 12 can be closed faster. Furthermore, a significantly greater volume can be filled and thereby a larger cross-section can be closed off with the multi-ply fire-protection tape 22 according to the invention than is the case with a single-ply fire-protection tape having the same thickness, because the plies 24a, 24b are moved apart before foaming and therefore do not hinder one another during foaming. The plies 24a, 24b can be connected with one another in any desired manner, as long as they can be moved relative to one another at the first longitudinal edges 26a, 26b or the second longitudinal edges 28a, 28b while the material of the plies 24a, 24b foams up.

A second embodiment is shown in FIG. 3, for example. This embodiment essentially corresponds to the embodiment shown in FIGS. 1 and 2. However, the connection means 30 does not extent into the plies 24a, 24b, but rather is connected with the plies 24a, 24b on their surfaces that face one another, particularly glued onto them.

Furthermore, an expansion region 34 is provided between the plies 24a, 24b, which is formed by a region of the connection means 30 that is folded multiple times, which region, in the starting state of the fire-protection tape 22, is disposed between the plies 24a, 24b. This expansion region allows a certain separation movement of the second longitudinal edges 28a, 28b, so that these can additionally move apart during foaming of the plies 24a, 24b.

A further embodiment is shown in FIG. 4. In this embodiment, the connection means is embedded into the plies in accordion-like manner, so that a different unfolding geometry occurs. In particular, in this embodiment, not only can the first longitudinal edges 26a, 26b move apart from one another, but the second longitudinal edges 28a, 28b can do so as well.

Fundamentally, it is conceivable that the plies 24a, 24b move apart from one another in any desired manner, in the event that they start to foam up. In particular, the reciprocal movement of the plies 24a, 24b can be adapted to the respective area of application or to the size of the gap to be closed.

The invention claimed is:
1. A fire-protection tape comprising:
at least two plies comprising an intumescent material; and
a flexible connector which flexibly connects the plies with one another, such that said plies can be pivoted relative to one another,
wherein the plies have a first longitudinal edge on one outer side and a second longitudinal edge on an opposite outer side, in each instance; and
wherein the connector is connected with the plies only at their first longitudinal edges or only at their second longitudinal edges, in each instance.
2. The fire-protection tape according to claim 1, wherein the plies are connected with one another in such a manner that they are pressed apart by activation of the intumescent material, at a longitudinal edge, and subsequently can gape apart.
3. The fire-protection tape according to claim 1, wherein the connector is a woven fabric.
4. The fire-protection tape according to claim 1, wherein the connector has a flexible expansion region between the plies.
5. The fire-protection tape according to claim 4, wherein the connector is folded at least once.
6. The fire-protection tape according to claim 1, wherein the plies are connected with the connector over the connector's full area.
7. The fire-protection tape according to claim 6, wherein the connector is connected with the two plies on their surfaces that face away from one another.
8. The fire-protection tape according to claim 1, wherein the connector extends into the plies, at least in part.
9. The fire-protection tape according to claim 1, wherein the connector connects the plies with one another with shape fit and/or material fit, wherein the connector can be dissolved at a temperature below the intumescence temperature of the two plies.
10. The fire-protection ape according to claim 9, wherein the connector is a thread, a clip or a connection layer,
wherein the thread, the clip or the connection layer has a softening, melting or decomposition temperature below the intumescence temperature of the two plies.
11. The fire-protection tape according to claim 10 comprising a thread or a clip, wherein the thread or clip comprises a plastic, the softening, melting or decomposition temperature of which lies below the intumescence temperature of the two plies.
12. The fire-protection tape according to claim 11, wherein the thread or clip consists of a plastic, the softening, melting or decomposition temperature of which lies below 60° C.
13. The fire-protection tape according to claim 10, wherein the connection layer is a double-sided adhesive tape.
14. The fire-protection tape according to claim 10, wherein the thread, the clip or the connection layer has a softening, melting or decomposition temperature below 60° C.
15. The fire-protection tape according to claim 1, wherein the connector is a woven fiberglass fabric.
16. The fire-protection tape according to claim 1, wherein the plies are connected with the connector over its full area and are glued onto it.
17. The fire-protection tape according to claim 1, which is placed in a gap in a wall or a ceiling of a building.
18. A fire-protection tape comprising:
at least two plies comprising an intumescent material; and
a thread or clip as a connection between the two plies, which connects the plies with one another with shape fit and/or material fit,
wherein the plies have a first longitudinal edge on one outer side and a second longitudinal edge on an opposite outer side, in each instance;

wherein the plies are flexibly connected with one another such that said plies can be pivoted relative to one another;

wherein the connection can be dissolved at a temperature below the intumescence temperature of the two plies; and wherein the connection comprises a plastic, the softening, melting or decomposition temperature of which lies below the intumescence temperature of the two plies.

19. The fire-protection tape according to claim 18, wherein the thread or clip consists of a plastic, the softening, melting or decomposition temperature of which lies below 60° C.

* * * * *